United States Patent [19]
Assard et al.

[11] Patent Number: 5,923,030
[45] Date of Patent: Jul. 13, 1999

[54] SYSTEM AND METHOD FOR RECOVERING A SIGNAL OF INTEREST FROM A PHASE MODULATED SIGNAL USING QUADRATURE SAMPLING

[75] Inventors: Gerald L. Assard, Waterfor, Conn.; Antonio L. Deus, III, Westerly, R.I.; Barry A. Blakely, Essex, Vt.

[73] Assignee: The United States of America as represented by the Secretary of the Navy, Washington, D.C.

[21] Appl. No.: 08/967,740

[22] Filed: Nov. 10, 1997

[51] Int. Cl.$^6$ .................................................. H01J 5/16
[52] U.S. Cl. ................ 250/227.19; 250/216; 359/183; 375/326
[58] Field of Search .......................... 250/227.19, 216; 359/181–183; 375/324–326, 298; 356/345

[56] References Cited

U.S. PATENT DOCUMENTS 5,117,440  5/1992  Smith et al. ........................... 375/328

*Primary Examiner*—Que T. Le
*Attorney, Agent, or Firm*—Michael J. McGowan; Prithvi C. Lall; Michael F. Oglo

[57] ABSTRACT

A digital receiver system is used to recover a signal of interest, such as a measurand signal, from a phase modulated signal detected from a system utilizing quadrature carriers, such as a fiber optic interferometer sensor system. The digital receiver system includes a quadrature sampling demodulator that samples the phase modulated signal by using quadrature sampling periods to recover the odd and even components of the signal of interest. The digital receiver system can be used with an interferometer sensor system having an array of sensors that multiplex the measurand signals, e.g., using time or wavelength division multiplexing. Sampling with quadrature time samples provides a spacing in time between the samples that allows additional sensors to be multiplexed.

20 Claims, 3 Drawing Sheets

SYSTEM AND METHOD FOR RECOVERING A SIGNAL OF INTEREST FROM A PHASE MODULATED SIGNAL USING QUADRATURE SAMPLING

CROSS REFERENCES TO RELATED PATENT APPLICATIONS

This instant application is related to a U.S. patent application Ser. No. 08/967, 741, filed Nov. 10, 1997, now U.S. Pat. No. 5,883,548, entitled A DEMODULATION SYSTEM AND METHOD FOR RECOVERING A SIGNAL OF INTEREST FROM AN UNDERSAMPLED, MODULATED CARRIER (Navy Case No. 77556) having same filing date.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

(1) Field of the Invention

The present invention relates to systems and methods for recovering signals of interest from a phase modulated signal and more particularly, to a digital receiver system for receiving a phase modulated signal from a fiber optic interferometer and recovering a measurand signal by sampling the phase modulated signal using quadrature time samples.

(2) Description of the Prior Art

Fiber optic interferometers are highly sensitive devices for the measurement of time-varying measurand fields or signals, such as acoustic pressure, vibration and magnetic fields. The acoustic pressure changes, vibrations or magnetic fields affect the light transmitting characteristics of the optical fibers used in the interferometer, producing a change in the phase of the light signals traveling through the optical fibers. A measurement of the change in phase of the optical signal transmitted through the optical fiber is representative of the changes in the environmental conditions or measurand field acting on the optical fiber.

Typically, fiber optic interferometers utilize two optical paths or fibers, and an optical source, such as a laser, which provides a light signal in the optical paths. The measurand signal modulates the phase of the light signal in one or both of the optical paths, and the light signal thereby acts as a carrier for the measurand signal. The phase modulated optical signal is produced by interfering the optical signals in both paths, and the components of the phase modulated signal include both the carrier signal and the measurand signal.

One type of interferometric sensor system employs a phase generated carrier concept using two quadrature carriers, for example, having the frequencies $\omega_c$ and $2\omega_c$ or $2\omega_c$ and $3\omega_c$. The carriers can be generated by directly modulating the optical source in the interferometer at the carrier frequency $\omega_c$ or with an external phase modulator that provides the carrier frequency $\omega_c$ after the light signal has been generated. When the optical signal having the carrier frequency of $\omega_c$ passes through the interferometer sensors and is modulated by the measurand, the resulting phase modulated signal includes quadrature carriers at harmonics or multiples of the carrier frequency (e.g., $\omega_c$, $2\omega_c$, $3\omega_c$, $4\omega_c$, . . . ) Using the quadrature carriers in the demodulation process prevents fading of the interferometric signal and normalizes the detected signal.

Various demodulation techniques have been used to recover the signal of interest or measurand signal from the phase modulated optical signal output from a fiber optic interferometer or other systems utilizing quadrature carriers. According to one technique, receiver systems convert the phase modulated signal from analog to digital and then use a homodyne technique to demodulate and recover the measurand signals from the quadrature carriers. To reconstruct the phase modulated signal, previous systems used sampling rates that satisfy Nyquist's criteria, i.e., a minimum sampling rate of twice the carrier frequency $\omega_c$. If the system uses quadrature carriers at $\omega_c$ and $2\omega_c$, the minimum sampling rate according to the previous systems must be $4\omega_c$. The high sampling rates required by these systems (i.e., at least four times the lowest carrier frequency) places great demands on the sampling circuitry and limits the sensor bandwidth and the number of channels.

The use of analog circuitry, such as analog multipliers, filters, integrators and differentiators, in conventional receiver systems to demultiplex and demodulate signals from an array of interferometers also has a number of limitations and disadvantages. The components forming the analog circuits must be gain and phase matched with the carrier signal during the demodulation process to optimize performance, which is costly and difficult to achieve. Using the conventional homodyne technique, for example, to recover the measurand signal requires multiplication of the quadrature carriers by a local oscillator of the proper frequency, phase and amplitude. Failure to adequately match the amplitude and phase results in harmonic distortion, which reduces the useful dynamic range of the interferometer. The output level of prior art demodulators using analog circuitry is also limited by the power supply. Furthermore, noisy analog circuitry (e.g., multipliers and filters) can increase the noise floor of the system.

Fiber optic interferometer systems also commonly use an array of sensors to detect the measurand field over a larger area. One application for an array of fiber optic interferometer sensors is to detect acoustic waves, for example, in an underwater environment. If an array of fiber optic interferometer sensors are used, multiple signals are multiplexed on one or more fibers, for example, by using time division multiplexing (TDM) or wavelength division multiplexing (WDM) techniques. The phase modulated signal output from the array of fiber optic interferometer sensors must be demultiplexed to obtain the multiple signals of interest. One example of a TDM sensor system is sampled with a pulsed optical interrogation signal.

SUMMARY OF THE INVENTION

One object of the present invention is to recover a signal of interest or measurand signal from a phase modulated signal by sampling the phase modulated signal with quadrature time samples to allow higher channel count systems with higher bandwidth sensors.

Another object of the present invention is to sample and demodulate the signal using digital signal processing techniques to provide a higher dynamic range, lower electronic noise, easier operation, and repeatable performance from channel to channel.

A further object of the present invention is a digital receiver system for quadrature sampling and demodulating a phase modulated signal in any system utilizing quadrature carriers.

The present invention features a system and method of recovering one or more signals of interest from a phase modulated signal generated by a system utilizing quadrature carriers. The signals of interest are sensed by one or more sensors and modulate a carrier signal to form the phase modulated signal f(t). The method comprises the steps of: receiving the phase modulated signal f(t); sampling the phase modulated signal f(t) using quadrature time samples of $m/f_c$ and $m/f_c+\Delta t$, where $m \geq 1$, $f_c/m \geq 2\Delta f_h$, and $\Delta f_h$ is the bandwidth of the sensors, to produce odd sampled signal components and even sampled signal components; and determining the signal of interest from the odd and even sampled signal components.

The preferred method further includes the steps of: matching gains of the odd sampled signal component and even sampled signal component; normalizing the odd sampled signal component and the even sampled signal component to form normalized odd and even sampled signal components; and processing the normalized odd and even sampled signal components using a differentiate and cross multiply process. One example of the step of normalizing includes taking the square root of the sum of the squares of the odd sampled signal component and the even sampled signal component and dividing.

The present invention also features a digital receiver system comprising a quadrature sampling demodulator that samples the phase modulated signal using quadrature time samples. The system preferably includes a gain adjuster, responsive to the quadrature sampling demodulator, for adjusting and matching gains of the odd and even sampled signal components from the quadrature sampling demodulator. The system can also include circuitry for normalizing the odd and even sampled signal components and for performing an arctangement, a differentiate and cross-multiply process, or any other phase demodulation technique to recover the signal of interest.

In one example, the system utilizing quadrature carriers is a fiber optic interferometer, the sensor is a fiber optic interferometer sensor, and the signal of interest is a measurand signal acting on the fiber optic interferometer sensor. An optical source generates an optical carrier signal that is modulated by the measurand signal acting on the sensor. The method further includes the step of photodetecting the phase modulated signal f(t) output from the fiber optic interferometer sensor prior to sampling said phase modulated signal f(t). In the exemplary embodiment, phase modulated signal f(t) preferably has the form $f(t)=A+B\cos(C\cos(\omega_c(t)+\phi_c)+D\cos\ (\omega_h(t)+\phi_h)+\text{Phi}(t))$ where:
A=the DC level of light from the optical source;
B=the magnitude of the phase modulated signal;
C=the magnitude of the carrier signal;
$\phi_c$=the phase of the carrier signal;
D=the magnitude of a spectrum level of the sensor;
$\phi_h$=the phase of the signal of interest; and
Phi(t)=the time varying phase shift due to environmental effects.

BRIEF DESCRIPTION OF THE DRAWINGS

These and other features and advantages of the present invention will be better understood in view of the following description of the invention taken together with the drawings herein.

DESCRIPTION OF THE PREFERRED EMBODIMENT

Figure 1:
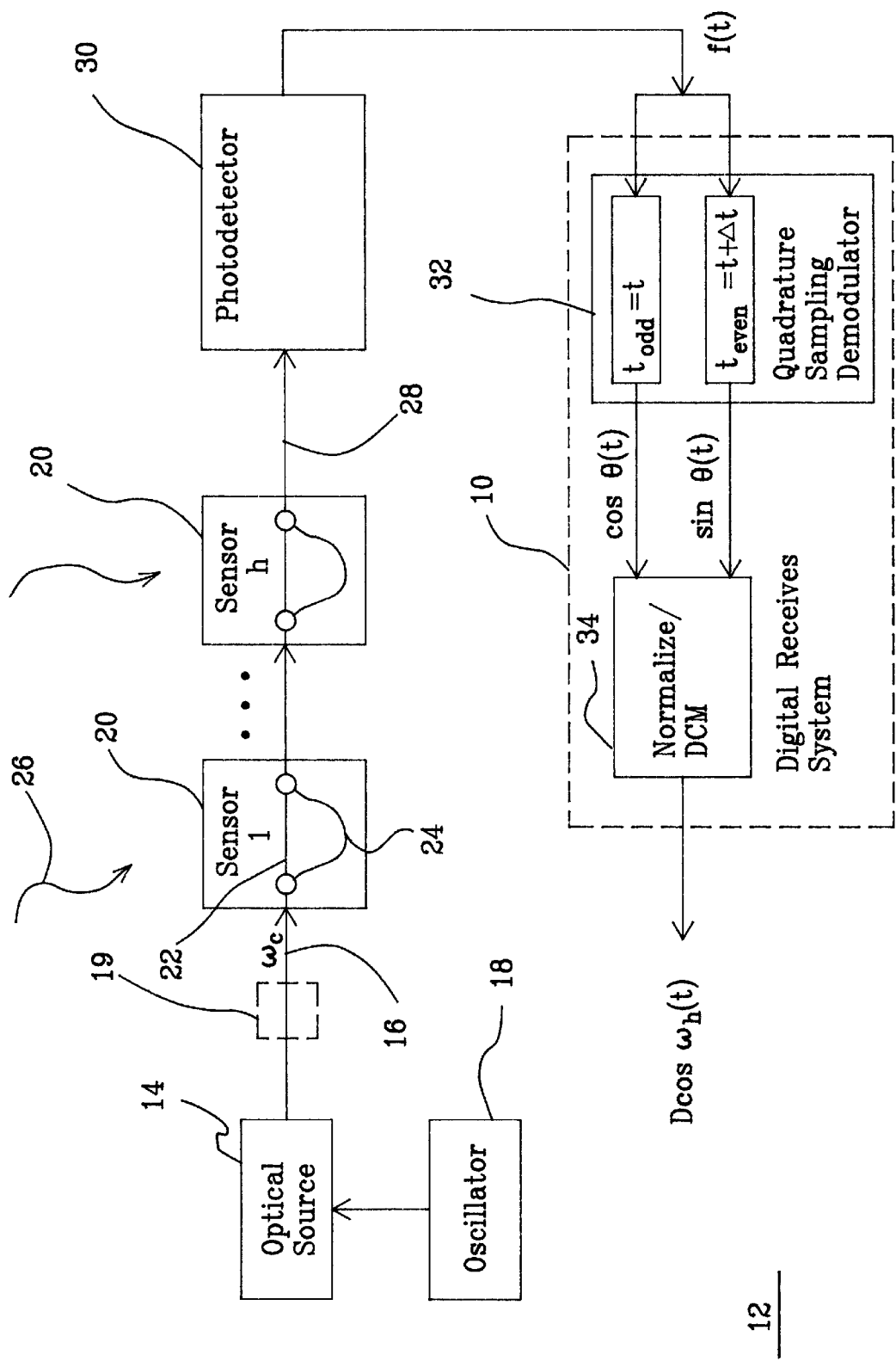
FIG. 1 is a schematic block diagram of an interferometer system including a digital receiver system, according to the present invention.

A digital receiver system 10, FIG. 1, according to the present invention, is used to recover a signal of interest from a phase modulated signal in a phase generated carrier system utilizing quadrature carriers. According to the exemplary embodiment of the present invention, the digital receiver system 10 is used in a conventional fiber optic interferometer sensor system 12 using a phase generated carrier concept. The present invention contemplates, however, using the digital receiver system 10 and the demodulation concepts of the present invention with any system utilizing quadrature carriers, for example, in transmission lines and/or through the radio frequency airways.

The exemplary interferometer sensor system 12 includes an optical source 14, such as a laser, that generates an optical signal in an optical path or fiber 16. According to one example, an oscillator 18 directly modulates the optical source 14 to produce an optical carrier signal having a frequency of $\omega_c$. Alternatively, an external phase modulator 19 can be used to modulate the optical signal generated by the optical source 14 as the optical signal passes through the external phase modulator 19. For example, the optical fiber 16 can be stretched and relaxed at the carrier frequency $\omega_c$ as the optical signal passes through, e.g., using a piezoelectric material bonded to the fiber, thereby generating an optical signal having a frequency of $\omega_c$.

The optical carrier signal is transmitted through the optical fiber 16 to at least one interferometer sensor 20 in which the optical carrier signal is split into two optical paths 22, 24. At least one signal of interest 26 from a measurand field, such as an acoustic pressure or a magnetic field, modulates the phase of the optical carrier signal in one or both of the optical paths 22, 24. The sensor 20 then produces a phase modulated optical signal by interfering the optical carrier signal in both of the optical paths 22, 24. The phase modulated optical signal has an interference pattern corresponding to the sensed change in the measurand field or signal of interest 26.

In one embodiment, the system 12 includes an array of interferometer sensors 20 connected in series. The measurand signals 26 sensed by each of the sensors 20 are multiplexed on a single output optical fiber 28 using either time division multiplexing (TDM) or wavelength division multiplexing (WDM), or a combination of both. TDM sensor systems are sampled with a pulsed optical interrogation signal.

The phase modulated optical signal is then detected with a photodetector 30 to convert the phase modulated optical signal into a phase modulated electrical signal f(t) that varies with time. The phase modulated electrical signal f(t) detected from the interferometer sensors 20 has the following form:

$$f(t) = A + B\cos(C\cos(\omega_c t + \phi_c) + \theta(t)) \quad (1)$$
$$= A + B\cos(C\cos(\omega_c t + \phi_c) + D\cos(\omega_h t + \phi_h) + Phi(t))$$

where A is the DC level of the light from the optical source; B represents the magnitude of the phase modulated signal; C is the magnitude of the carrier signal; $\phi_c$ is the phase of the carrier signal; D is the magnitude of the signal of interest or measured signal; $\phi_h$ is the phase of the signal of interest or measurand signal; and Phi(t) is the time varying phase shift (or noise) due to environmental effects, such as temperature variations and mechanical stimulation, on the optical paths or fibers of the interferometer sensor. The term $D\cos((\omega_h(t))$ represents the signal of interest to be recovered from the phase modulated signal f(t) using quadrature sampling demodulation, as will be described in greater detail below.

Figure 2:
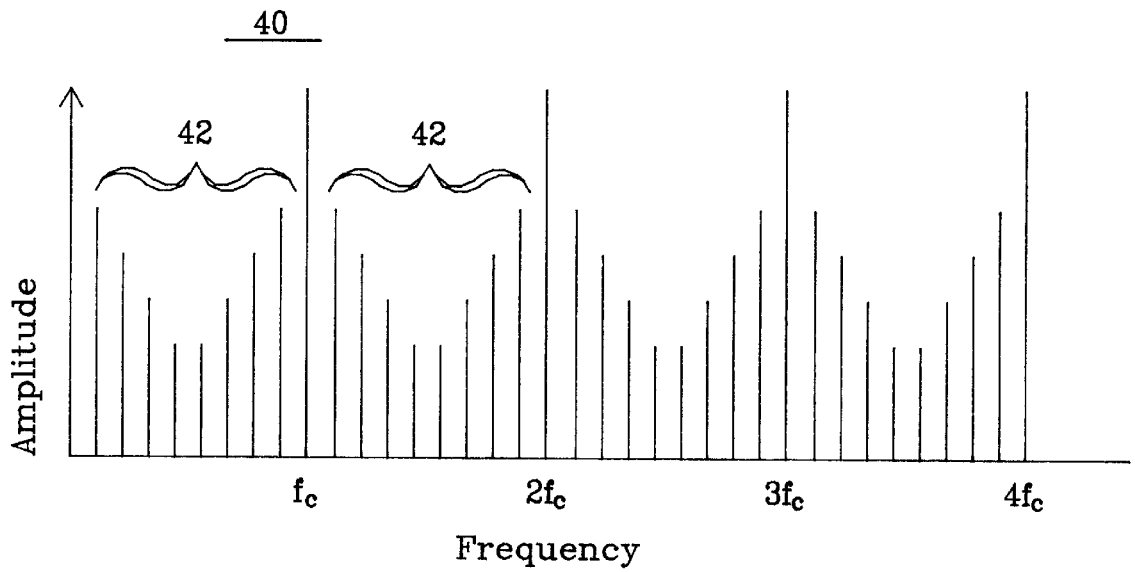
FIG. 2 is a graphical representation of the frequency spectrum of a phase modulated signal, according to the present invention.

Both the carrier and measurand signals are represented in the phase modulated signal f(t), as shown graphically by the frequency spectrum 40, FIG. 2, of the phase modulated signal f(t). The frequency spectrum 40 of the phase modulated signal f(t) includes multiple quadrature carrier frequencies $f_c$, $2f_c$, $3f_c$, $4f_c$, . . . (where $f=\omega/2\pi$) with sidebands 42 around each of the carrier frequencies. The sidebands 42 represent spectral frequencies of the measurand signal and its harmonics, which are spaced from the respective carrier frequencies $f_c$ by integral multiples of the modulating frequency $f_h$ of the measurand signal.

After the phase modulated signal f(t) is photodetected, the phase modulated signal f(t) is received by the digital receiver system for sampling and for demodulating the phase modulated signal f(t) to recover the signal of interest $D\cos(\omega_h(t))$. The phase modulated signal f(t) is undersampled at a sampling rate lower than the minimum sampling rates used in previous systems, as disclosed in a related application to the same inventors, with the same filing date(Attorney Docket No., Navy Case No. 77556) entitled A DEMODULATION SYSTEM AND METHOD FOR RECOVERING A SIGNAL OF INTEREST FROM AN UNDERSAMPLED, MODULATED CARRIER, incorporated herein by reference.

As discussed above, previous systems used sampling rates of at least twice the highest carrier frequency to accurately reconstruct the phase modulated carrier signal. However, only the sidebands 42 of the phase modulated signal need to be accurately reconstructed by sampling to recover the measurand signal. The sampling rate $f_s$ must therefore be at least twice the bandwidth $\Delta f_h$ of the signal of interest or measurand signal, which is significantly less than the carrier frequency $f_c$.

According to the present invention, the undersampling is performed using quadrature time samples such that the sampling also demodulates the phase modulated signal by producing odd and even sampled signal components that represent the sidebands 42, as will be described in greater detail below. The digital receiver system 10 (FIG. 1) includes a quadrature sampling demodulator 32 for sampling and demodulating the phase modulated signal to produce the odd and even sampled signal components. The digital receiver system 10 further includes circuitry 34, as will be described in greater detail below, for completing the demodulation process and recovering the signal of interest or measurand signal $D\cos(\omega_h(t))$ from the odd and even sampled signal components, for example, by normalizing and performing a differentiate and cross-multiply (DCM) process.

The following mathematical representation of the demodulation process illustrates how the measurand signal is recovered from the phase modulated carrier signal f(t). The phase modulated signal f(t) can be represented mathematically as a Bessel series with the amplitudes of the carrier and sidebands determined by Bessel functions. Setting the carrier phase $\phi_c$ and measurand phase $\phi_h$ to be zero, the Bessel expansion of the phase modulated signal $f(t)=A+B\cos(C\cos\omega_c t+\theta(t))$, where $\theta(t)=D\cos\omega_h t+Phi(t)$, is as follows:

$$f(t) = A + B\left\{\begin{array}{l}\left[J_0(C) + 2\sum_{k=1}^{\infty}(-1)^k J_{2k}(C)\cos 2k\omega_c t\right]\cos\theta(t) \\ -\left[2\sum_{k=0}^{\infty}(-1)^k J_{2k+1}(C)\cos(2k+1)\omega_c t\right]\sin\theta(t)\end{array}\right\} \quad (2)$$

where $\cos\theta(t)$ and $\sin\theta(t)$ represent the sidebands 42, which can be represented through another Bessel expansion:

$$\cos\theta(t) = \left[J_0(D) + 2\sum_{k=1}^{\infty}(-1)^k J_{2k}(D)\cos 2k\omega_h t\right]\cos Phi(t) - \quad (3)$$
$$\left[2\sum_{k=0}^{\infty}(-1)^k J_{2k+1}(D)\cos(2k+1)\omega_h t\right]\sin Phi(t)$$

$$\sin\theta(t) = \left[2\sum_{k=0}^{\infty}(-1)^k J_{2k+1}(D)\cos(2k+1)\omega_h t\right]\cos Phi(t) + \quad (4)$$
$$\left[J_0(D) + 2\sum_{k=1}^{\infty}(-1)^k J_{2k}(D)\cos 2k\omega_h t\right]\sin Phi(t)$$

Thus, Bessel expansion equation (2) includes the odd and even Bessel terms of the carrier, i.e., $\omega_c$ and $2\omega_c$. The terms $\cos\theta(t)$ and $\sin\theta(t)$, as shown by the Bessel expansion equations (3) and (4), include the odd and even Bessel terms of the measurand signal, i.e., $\omega_h$ and $2\omega_h$. The phase term Phi(t) in equations (3) and (4) determines if the odd or even Bessel terms (or both) of the measurand signal are carried around the odd or even Bessel terms of the phase generated carrier, as represented in equation (2).

Figure 3:
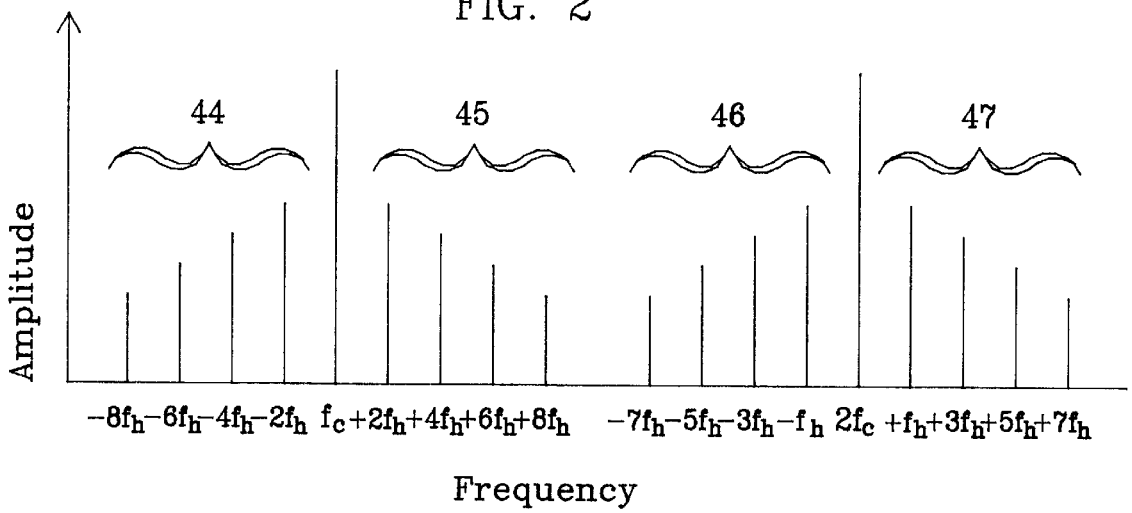
FIG. 3 is an exploded view of the graphical representation in FIG. 2 showing the sidebands around the carrier frequency $f_c$ and first multiple of the carrier frequency $2f_c$.

According to the preferred embodiment of the present invention, the quadrature carriers $f_c$ and $2f_c$ (or $\omega_c$ and $2\omega_c$) are used to recover the signal of interest by extracting the sidebands 44–47, FIG. 3, centered around the quadrature carriers $f_c$ and $2f_c$. Where only the quadrature carriers $f_c$ and $2f_c$ are used, the Bessel expansion in equation (2) can be reduced by setting k=0 and k=1 as follows:

$$f(t)=-2BJ_2(C)\cos 2\omega_c t\cos\theta(t)-2BJ_1(C)\,\cos\omega_c t\sin\theta(t) \quad (5)$$

The amplitudes of the quadrature carriers are preferably equalized to ensure minimal distortion of the reconstructed signal. The amplitude of the quadrature carriers, as represented by the odd and even terms in the Bessel series, are equalized by adjusting the level of phase modulation. In other words, the magnitude C of the carrier is varied by adjusting the modulation of the optical source 14, for example, through external modulator 19. When the amplitudes in the Bessel expansion of equation (5) are equalized, i.e., $J_2(C)=J_1(C)$, the odd and even Bessel terms are given as follows, where $k=-2BJ_2(C)=-2BJ_1(C)$:

$$f_{\omega 1}(t)=k\cos\omega_c t\sin\theta(t) \quad (6)$$
$$f_{\omega 2}(t)=k\cos 2\omega_c t\cos\theta(t) \quad (7)$$

Figure 4:
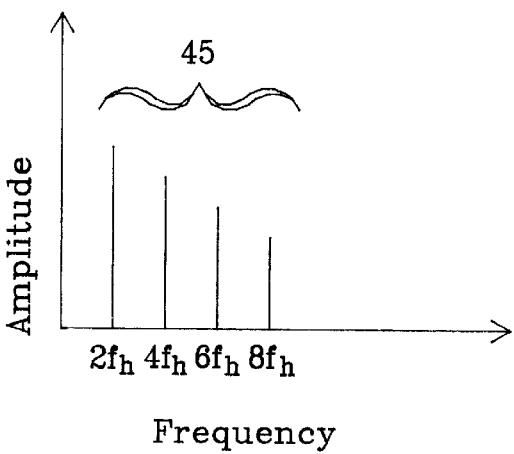
FIG. 4 is a graphical representation of the basebanded sidebands for the carrier frequency $f_c$.
Figure 5:
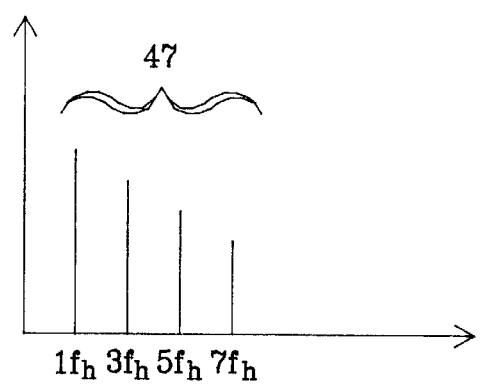
FIG. 5 is a graphical representation of the basebanded sidebands for the first multiple of the carrier frequency $2f_c$.
Figure 6:
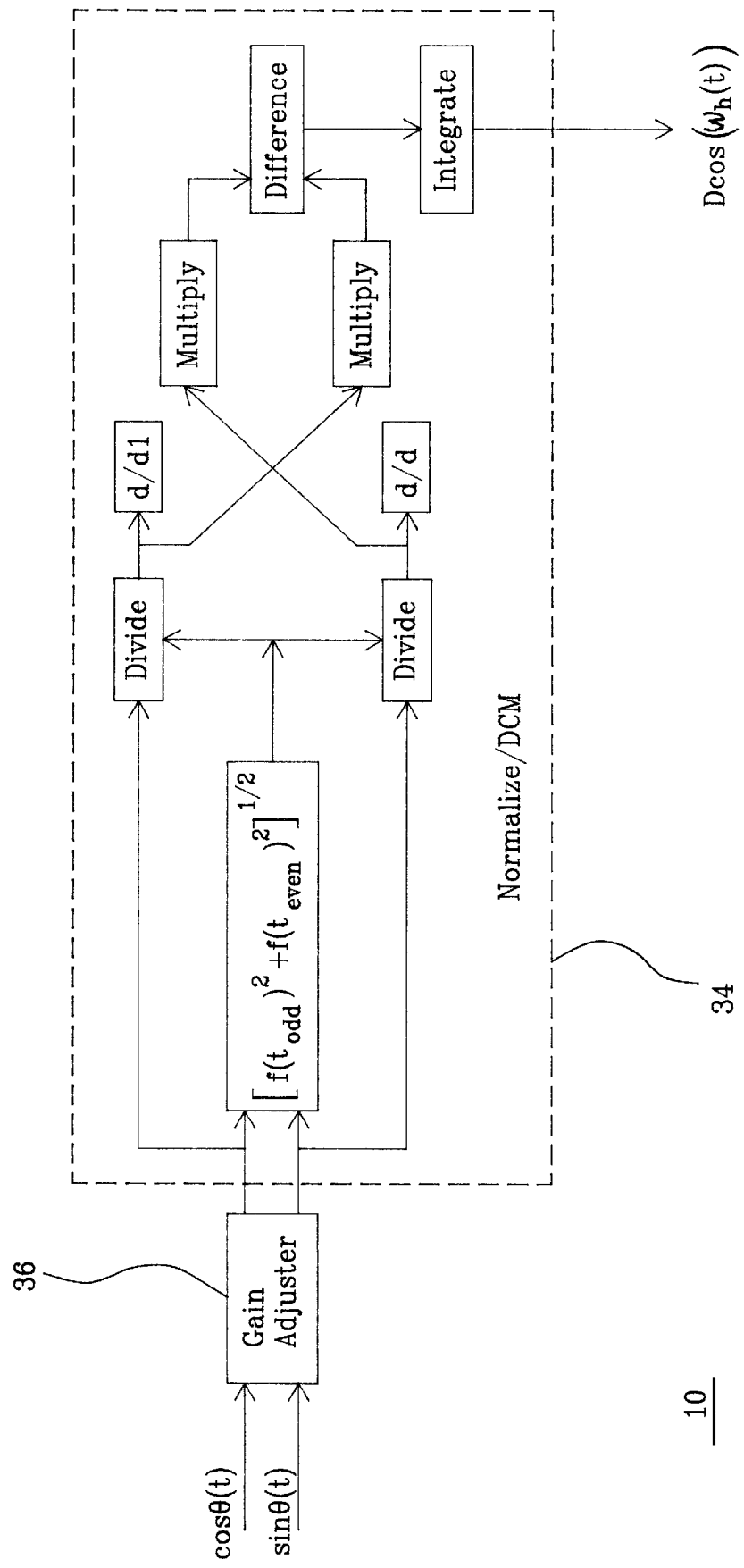
FIG. 6 is a schematic block diagram of the digital receiver system used in the interferometer sensor system, according to one embodiment of the present invention.

To recover the measurand signal, the sidebands 45, 47 centered around the carriers $f_c$ and $2f_c$, as shown in FIG. 3, are moved to the baseband, as shown in FIGS. 4 and 5 respectively. According to previous demodulation methods, the sidebands are basebanded by multiplication of the phase modulated signal f(t). The quadrature sampling according to the present invention is mathematically similar to a multiplication that results in the sidebands being moved to the baseband. The effect of moving the sidebands to the baseband by multiplying the odd and even terms in equations (6) and (7) by $\cos\omega_c t$ is shown as follows:

$$= k\cos^2\omega_c t \sin\theta(t) \quad (8)$$

$$= \frac{k}{2}\sin\theta(t) + \frac{k}{2}\cos2\omega_c t \sin\theta(t)$$

$$= k\cos^2 2\omega_c t \cos\theta(t) \quad (9)$$

$$= \frac{k}{2}\cos\theta(t) + \frac{k}{2}\cos4\omega_c t \cos\theta(t)$$

The term $(k/2)\sin\theta(t)$ in equation (8) represents the basebanded sidebands 45 shown in FIG. 4, and the term $(k/2)\cos\theta(t)$ in equation (9) represents the basebanded sidebands 47 shown in FIG. 5. Thus, the sidebands 45, 47 of $\omega_c$ and $2\omega_c$ are no longer located about $\omega_c$ and $2\omega_c$ but are now located in the baseband. The measurand signal can then be reconstructed from the basebanded sidebands 45, 47, i.e., $(k/2)\sin\theta(t)$ and $(k/2)\cos\theta(t)$.

The quadrature sampling demodulator 32 demodulates the phase modulated signal f(t) and extracts the sidebands by using quadrature sampling periods that produce odd sampled signal components ($\cos\theta(t)$) and even sampled signal components ($\sin\theta(t)$). The sidebands around the quadrature carriers (or odd and even terms in the Bessel expansion) are in quadrature or 90° out of phase. Taking samples at a time period of t and a time period of t plus a quadrature time shift of $\Delta t$ will extract the orthogonally related sidebands. The time shift of $\Delta t$ provides for the quadrature phase shift of the sidebands around the even term ($\omega_{c2}$) relative to the sidebands around the odd term ($\omega_{c1}$) and is equal to a time period of one quarter of a cycle of the carrier, i.e. $\Delta t=0.25/f_c$ where $f_c=\omega_c/2\pi$.

The sampling rate $f_s$ can thus be less than the carrier frequency $f_c$ such that the quadrature sampling periods are represented as $m/f_c$ and $m/f_c+\Delta t$, where $m \geq 1$, and where the sampling rate $f_c/m \geq 2\Delta f_h$. The sampling period of $m/f_c$ recovers the odd terms and the quadrature sampling period, $m/f_c+\Delta t$, recovers the even terms. Sampling according to this method thus produces quadrature time sample pairs in which the odd harmonics are contained in an array of samples 1, 3, 5 . . . taken at $t=m/f_c$ while the even harmonics are contained in an array of samples 0, 2, 4 . . . taken at $t+\Delta t=(m+0.25)/f_c$.

This process produces the functions shown in equations (10) through (13) for time samples t=1, 2, 3, 4 . . . . The odd time samples 1, 3, 5, . . . taken at the sampling period of $m/f_c$ are represented with the following equation:

$$f_{\omega_{c1}}(t)=B\cos(C\cos(2m\pi f_c(t/f)+\phi_c)+D\cos(2m\pi f_h(t/f_c)+\phi_h)+\text{Phi}(t)) \quad (10)$$

The even time samples 0, 2, 4, . . . taken at the sampling period of $m/f_c+\Delta t$ are represented with the following equation:

$$f_{\omega_{c2}}(t)=B\cos(C\cos(2m\pi f_c(t+\Delta t)/f_c+\phi_c) +D\cos(2m\pi f_h(t+\Delta t)/f_c+\phi_h)+ \text{Phi}(t)) \quad (11)$$

Simplifying equations (2) and (3) demonstrates how the carrier is shifted to the baseband, as a DC component:

$$f_{w_{c1}}(t)=B\cos(C\cos(2\pi t+\phi_c) +D\cos(2\pi f_h t/f_c+\phi_h)+\text{Phi}(t)) \quad (12)$$

$$f_{\omega_{c2}}(t)=B\cos(C\cos (2\pi(t+\Delta t)+\phi_c)+D\cos(2\pi f_h(t+\Delta t)/f_c+\phi_h)+\text{Phi}(t)) \quad (13)$$

According to one example, the sampling rate $f_s$ of the present invention is selected to be the same as the carrier frequency $f_c$ such that $t=1/f_c$ and $t+\Delta t=1.25/f_c$. An example of sampling in a previous oversampled system would have a sampling rate $f_s$ of $8f_c$. The following table illustrates a comparison between the time samples taken using the previous method and the quadrature sampling of the present invention:

| t = 1/8f$_c$ | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| t = 1/f$_c$, 1.25/f$_c$ | 0 | 1 | | | | | | | 2 | 3 | | | | | | | 4 | 5 |

Sampling according to the present invention provides spacing between the quadrature time sample pairs, allowing time to multiplex additional sensors from a single optical source. The undersampling using the quadrature sampling period, thereby allows higher channel count systems with higher bandwidth sensors because fewer time samples are required to reconstruct the data. Undersampling also reduces the number of samples that must be processed. The undersampled demodulated signal also does not contain spectral data outside of the modulated bandwidths of the carriers, eliminating the need for low pass filtering. Undersampling further eliminates the need for gain matched and phased locked local oscillators for demodulating the odd and even carriers to extract the sidebands.

In an interferometer sensor system having multiple sensors, the phase delay $\phi_c$ will vary from sensor to sensor. The phase $\phi_c$ is a function of the spacing of the sensors 20 relative to the photodetector 22 and determines the magnitude B of the phase modulated signal. This term does not have a time variable, because the spacing between multiple elements is fixed. The amplitude of B, due to the difference in the phase delays of the sensors, requires channel gains to be trimmed to present a common channel to channel sensitivity. The preferred embodiment of the digital receiver system 10, FIG. 2, includes a gain adjuster 36 for adjusting and matching the gain(s) in the odd and even channels to present a common channel to channel sensitivity.

Once the gains of the odd and even channels have been matched, the measurand signal $D\cos(\omega_h(t))$ is determined from the odd and even sampled signal components $\cos\theta(t)$ and $\sin\theta(t)$, for example, using conventional circuitry 34 for normalizing and performing a differentiate and cross-multiply process (DCM). One example of normalizing includes calculating the square root of the sum of the squares and dividing. The normalized odd and even terms can be processed using either a conventional analog or a digital differentiate and cross-multiply technique.

According to one alternative of the present invention, the time shift $\Delta t$ is set. This removes the need for equalizing the amplitude of the quadrature carriers. The magnitude of the phase modulated signal is detected and normalized to one before the phase modulated signal is sampled. The step of normalizing the signals (i.e., calculating the square root of the sum of the squares and dividing) prior to the DCM process can thus be eliminated. The magnitude and phase distortions caused by unequalized quadrature carriers is also eliminated.

Accordingly, the digital receiver system of the present application recovers a measurand signal from a phase modulated signal by undersampling and demodulating the phase modulated signal using quadrature time samples. By sampling using quadrature time samples, the rate of undersampling can be as low as two times the bandwidth of the sensor's modulation, thereby permitting higher sensor bandwidth and a larger number of channels because fewer time samples are required to reconstruct the data. Using the digital receiver system of the present invention to demodulate the phase modulated signals also provides a higher dynamic range, lower electronic noise, simplified operation and repeatable performance from channel to channel as compared to previous analog receiver systems.

In light of the above, it is therefore understood that within the scope of the appended claims, the invention may be practiced otherwise than as specifically described.

What is claimed is:

1. A method of recovering at least one signal of interest from a phase modulated signal generated by a system utilizing quadrature carriers, wherein said at least one signal of interest is sensed by at least one sensor and modulates a carrier signal to form said phase modulated signal f(t), said method comprising the steps of:

receiving said phase modulated signal f(t);

sampling said phase modulated signal f(t) using quadrature time samples of $m/f_c$ and $m/f_c+\Delta t$ where $m \geq 1$, $f_c/m \geq 2\Delta f_h$, and $\Delta f_h$ is the bandwidth of said at least one sensor, wherein sampling said phase modulated signal f(t) with said quadrature time samples produces odd sampled signal components and even sampled signal components; and determining said signal of interest from said odd and even sampled signal components.

2. The method of claim 1 wherein the step of determining said signal of interest from said odd and even sampled signal components includes the steps of:

matching gains of said odd sampled signal component and said even sampled signal component;

normalizing said odd sampled signal component and said even sampled signal component to form normalized odd and even sampled signal components; and processing said normalized odd and even sampled signal components using a differentiate and cross multiply process.

3. The method of claim 2 wherein the step of normalizing includes taking the square root of the sum of the squares of said odd sampled signal component and said even sampled signal component and dividing.

4. The method of claim 1 further including the step of normalizing said phase modulated signal f(t) prior to the step of sampling said phase modulated signal using quadrature time samples.

5. The method of claim 4 wherein the step of determining said signal of interest from said odd and even sampled signal components includes the step of processing said odd sampled signal component and said even sampled signal component using a differentiate and cross multiply process.

6. The method of claim 1 wherein said phase modulated signal f(t) has the form $f(t)=A+B\cos(C\cos(\omega_c)(t)+\phi_c)+D\cos(\omega_h(t)+\phi_h)+Phi(t))$ where:
A=the DC level of light from an optical source;
B=the magnitude of the phase modulated signal;
C=the magnitude of the carrier signal;
$\phi_c$=the phase of the carrier signal;
D=the magnitude of a spectrum level of the sensor;
$\phi_h$=the phase of the signal of interest; and
Phi(t)=the time varying phase shift due to environmental effects.

7. The method of claim 1 wherein said system utilizing quadrature carriers is a fiber optic interferometer, wherein said at least one sensor is a fiber optic interferometer sensor, and wherein said at least one signal of interest is a measurand signal acting on said fiber optic interferometer sensor to generate a phase modulated optical signal.

8. The method of claim 6 further including the step of photodetecting said phase modulated optical signal output from said fiber optic interferometer sensor to produce said phase modulated signal f(t) having the form $f(t)=A+B\cos(C\cos(\omega_c(t)+\phi_c)+D\cos\ (\omega_h(t)+\phi_h)+Phi(t))$ where:
A=the DC level of light from an optical source;
B=the magnitude of the phase modulated signal;
C=the magnitude of the carrier signal;
$\phi_c$=the phase of the carrier signal;
D=the magnitude of a spectrum level of the sensor;
$\phi_h$=the phase of the signal of interest; and
Phi(t)=the time varying phase shift due to environmental effects.

9. The method of claim 1 wherein said at least one sensor includes an array of sensors, and wherein said at least one signal of interest includes a plurality of multiplexed signals.

10. The method of claim 8 wherein said plurality of signals are time division multiplexed.

11. An interferometer sensor system for sensing a measurand signal, said system comprising:

an optical source for providing at least one optical carrier signal having a predetermined frequency $\omega_c$;

at least one sensor, for receiving said at least one optical carrier signal and responsive to said measurand signal, wherein said measurand signal modulates said at least one optical carrier signal received in said at least one sensor to form a phase modulated optical signal;

a photodetector, responsive to said phase modulated optical signal, for converting said phase modulated optical signal into a phase modulated electrical signal f(t) having the form $f(t)=A+B\cos(C\cos(\omega_c(t)+\phi_c)+D\cos(\omega_h(t)+\phi_h)+Phi(t))$ where:
   A=the DC level of light from said optical source;
   B=the magnitude of the phase modulated signal;
   C=the magnitude of the carrier signal $\omega_c$;
   $\phi_c$=the phase of the carrier signal;
   D=the magnitude of a spectrum level of the sensor;
   $\phi_h$=the phase of the signal of interest
   Phi(t)=the time varying phase shift due to environmental effects; and a digital receiver system, for sampling and demodulating said phase modulated electrical signal f(t), wherein said phase modulated electrical signal f(t) is sampled using quadrature time samples of $m/f_c$ and $m/f_c+\Delta t$ where $m \geq 1$, $f_c/m \geq 2\Delta f_h$, and $\Delta f_h$ is the bandwidth of said at least one sensor.

12. The interferometer sensor system of claim 11 wherein said digital receiver system includes sampling circuitry, for sampling said phase modulated electrical signal f(t) to produce odd and even sampled signal components.

13. The interferometer sensor system of claim 12 wherein said digital receiver system includes a gain adjuster, responsive to said sampling circuitry, for adjusting and matching gains of said odd and even sampled signal components.

14. The interferometer sensor system of claim 13 wherein said digital receiver system includes a means, responsive to said gain adjuster, for normalizing said odd and even signal components by calculating a square root of the sum of the squares of said odd and even signal components and dividing to produce normalized odd and even signal components.

15. The interferometer sensor system of claim 14 wherein said digital receiver system further includes a means, responsive to said means for normalizing, for differentiating and cross-multiplying said normalized odd and even signal components.

16. The interferometer sensor system of claim 11 wherein said digital receiver system includes a means for normalizing said phase modulated electrical signal prior to sampling said phase modulated electrical signal.

17. A digital receiver system for recovering at least one signal of interest from a phase modulated signal generated by a system utilizing quadrature carriers, wherein said at least one signal of interest is sensed by at least one sensor and modulates a carrier signal to form said phase modulated signal f(t), said system comprising:

a quadrature sampling demodulator for sampling said phase modulated signal f(t) using quadrature time samples of $m/f_c$ and $m/f_c+\Delta t$ where $m \geq 1$, $f_c/m \geq 2\Delta f_h$, and $\Delta f_h$ is the bandwidth of said at least one sensor, wherein sampling the phase modulated signal f(t) using quadrature time samples produces odd sampled signal components and even sampled signal components, wherein said odd and even sampled signal components include said signal of interest.

18. The digital receiver system of claim 17 further including a gain adjuster, responsive to said quadrature sampling demodulator, for adjusting and matching gains of said odd and even sampled signal components.

19. The digital receiver system of claim 18 further including a means, responsive to said gain adjuster, for normalizing said odd and even signal components by calculating a square root of the sum of the squares of said odd and even signal components to produce normalized odd and even signal components.

20. The digital receiver system of claim 19 further including a means, responsive to said means for normalizing, for differentiating and cross-multiplying said normalized odd and even signal components.

* * * * *